L. H. ZEIGLER.
FERRULE FOR RAKE HANDLES.
APPLICATION FILED MAR. 18, 1911.
1,025,501.
Patented May 7, 1912.
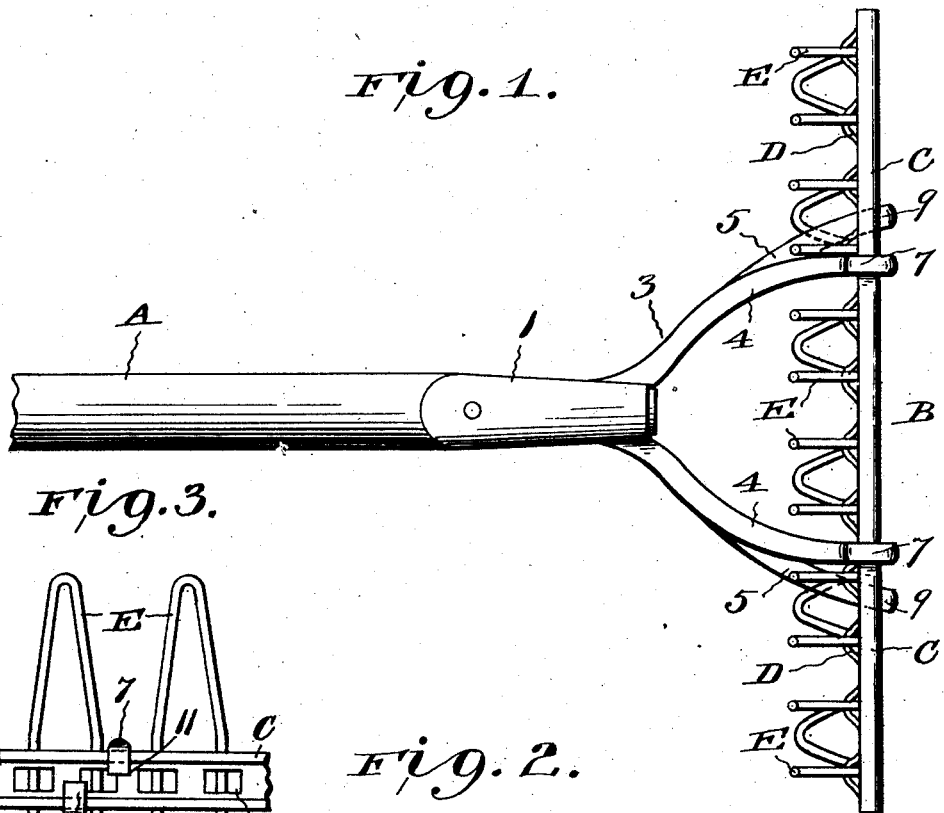
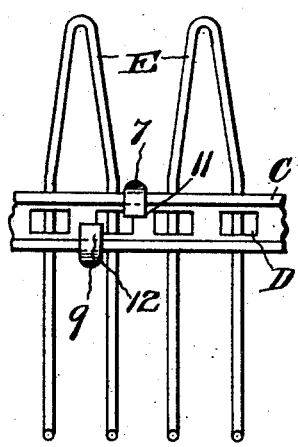
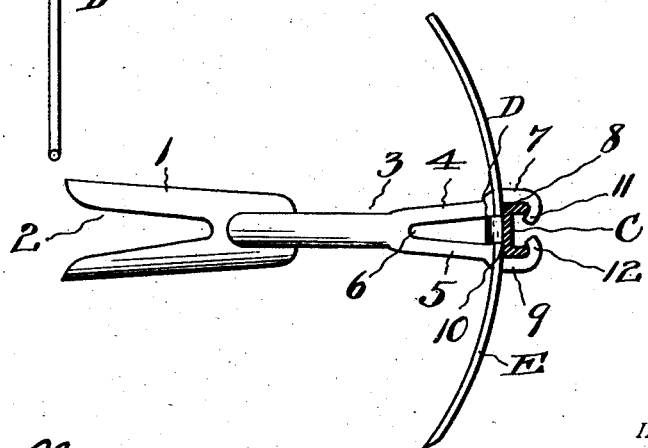
WITNESSES
INVENTOR;
Lyman H. Zeigler
by James R. Polk
Attorney ced to form upper and lower prongs 4
UNITED STATES PATENT OFFICE.

LYMAN H. ZEIGLER, OF REDKEY, INDIANA.

FERRULE FOR RAKE-HANDLES.

1,025,501.  Specification of Letters Patent.  Patented May 7, 1912.

Application filed March 18, 1911. Serial No. 615,227.

*To all whom it may concern:*

Be it known that I, LYMAN H. ZEIGLER, a citizen of the United States, and a resident of Redkey, in the county of Jay and State of Indiana, have invented certain new and useful Improvements in Ferrules for Rake-Handles, of which the following is a specification.

My invention relates to means for securing the handle to hand-rakes, and relates to the ferrule connecting the rake bar and handle.

The object of my invention is the provision of a ferrule having arms thereon provided with prongs that are spaced in a V shape, both in plan and elevation, and having claws on their ends with shoulders to engage the side of the bar adjacent to the handle, and with their outer ends bent to inclose the outer side of the bar, the prongs being located on the opposite sides of the rake-teeth to prevent lateral displacement of the handle relative to the rake-bar.

My invention will be described in detail hereinafter, and illustrated in the accompanying drawings, in which—

Figure 1 is a plan view of a rake showing my improved handle ferrule in position thereon; Fig. 2, a side view of the rake-bar and ferrule; and Fig. 3, a fragmental front view of the rake-bar showing the position of the bent claws relative to the rake-teeth.

In the drawings similar reference characters indicate corresponding views throughout the several views.

In the drawings A will be used to designate a handle, which is made of wood or other desired material, B the rake-head consisting of a channeled bar of metal C, formed with loops D to receive U-shaped teeth E. The rake-head shown is used to illustrate my device only and is not an essential feature of my invention, which consists of the construction of the ferrule to be hereinafter described, and any other form of rake-head may be employed without altering the spirit of my invention.

The ferrule consists of a socket 1 to receive the tapered end of handle A, and is provided with V-shaped notches 2 in its sides to permit the socket to be closely adjusted to the tapered end of the handle aforesaid.

3 indicates arms formed integral with socket 1 and extending forwardly and laterally therefrom and having their ends bifurcated to form upper and lower prongs 4 and 5, respectively. The upper prongs are shaped more nearly straight than the lower prongs, which extend laterally relatively to the upper prongs, so that the pair of prongs on each arm 3 form a V shape in plan, as clearly shown in Fig. 1. Furthermore, each pair of prongs is shaped in a V shape in elevation, as shown in Fig. 2, so that prongs 4 are positioned to engage the upper side of bar C and the prongs 5 the lower side of the bar, the angle between the prongs 4 and 5 being curved, as shown at 6, to form a brace to prevent splitting of the arms 3 at the angle. Prongs 4 are formed with upwardly and forwardly extending claws 7, forming shoulders 8, and prongs 5 with downwardly and forwardly extending claws 9, forming shoulders 10, said shoulders engaging the rear side of the bar C when placed in position between the claws, as shown in Fig. 2, to prevent rearward displacement of the bar when the rake is used with a forward thrust. The ends of prongs 7 and 9 are bent over the front side of the bar C, as shown at 11 and 12, respectively, so that when the connection between the prongs 4 and 5 and bar C is completed the bar is firmly held in position without undue strain to the metal of the prongs, the bending of the metal to form the shoulders 8 and 10 and ends 11 and 12 being so slight that the texture of the metal is not impaired.

As shown in Figs. 1 and 3, the prongs 4 and 5 are located on opposite sides of teeth E, so that lateral displacement of the prongs in the rake-head is effectually prevented.

Having thus described my invention, what I claim is—

In combination with a tool-head having a bar, and a tool-handle, a socket engaging said handle, arms extending from said socket, each of said arms formed with two prongs on its end V-shaped in plan and elevation, the upper of said prongs bent upwardly and forwardly and the lower prong bent downwardly and forwardly to receive the tool-head bar aforesaid, and the ends of the prongs bent to engage the front of said bar, substantially as shown and described.

In witness whereof, I have hereunto set my hand in presence of two subscribing witnesses.

LYMAN H. ZEIGLER.

Witnesses:
H. C. GIST,
WILLIAM WILLIAMS.

Copies of this patent may be obtained for five cents each, by addressing the "Commissioner of Patents, Washington, D. C."